United States Patent [19]

Yamada et al.

[11] Patent Number: 4,917,211
[45] Date of Patent: Apr. 17, 1990

[54] SEISMIC ISOLATOR

[75] Inventors: Takao Yamada; Katsunori Kurabe; Kengo Tagawa; Koichi Shibata, all of Tokyo, Japan

[73] Assignee: NKK Corporation, Tokyo, Japan

[21] Appl. No.: 287,735

[22] Filed: Dec. 21, 1988

[30] Foreign Application Priority Data

Dec. 26, 1987 [JP] Japan .................. 62-328441

[51] Int. Cl.$^4$ .......................... G10K 11/00
[52] U.S. Cl. ...................... 181/0.5; 52/167; 248/569; 248/636; 248/638; 181/401
[58] Field of Search ............ 181/0.5, 401; 52/167; 248/636, 638, 569

[56] References Cited

U.S. PATENT DOCUMENTS

| 4,371,143 | 2/1983 | Ishida et al. | 248/638 |
|---|---|---|---|
| 4,402,483 | 9/1983 | Kurabayashi et al. | 248/638 |
| 4,505,987 | 3/1985 | Yamada et al. | 428/553 |
| 4,554,767 | 11/1985 | Ikonomou | 52/167 |
| 4,565,039 | 1/1986 | Oguro et al. | 248/638 |
| 4,662,133 | 5/1987 | Kondo | 248/638 |
| 4,666,786 | 5/1987 | Yano et al. | 428/544 |
| 4,763,869 | 8/1988 | Nakamura et al. | 248/638 |
| 4,774,393 | 9/1988 | Tarumoto et al. | 219/121.69 |
| 4,805,359 | 2/1989 | Miyake et al. | 248/638 |

FOREIGN PATENT DOCUMENTS

| 160012 | 12/1979 | Japan . |
|---|---|---|
| 70359 | 6/1981 | Japan . |
| 124843 | 7/1983 | Japan . |
| 36144 | 8/1983 | Japan . |
| 36145 | 8/1983 | Japan . |
| 18500 | 4/1984 | Japan . |
| 179970 | 10/1984 | Japan . |
| 60-02 | 1/1985 | Japan . |

OTHER PUBLICATIONS

Paper presented at annual technical meeting of the Architetural Institute of Japan on Oct. 1987, in English entitled "Fundamental Study on the Seismic Isolation with the Friction", by Matsumoto et al.

Primary Examiner—Charles T. Jordan
Assistant Examiner—J. Woodrow Eldred
Attorney, Agent, or Firm—Frishauf, Holtz, Goodman & Woodward

[57] ABSTRACT

A seismic isolator comprises: a friction device having upper friction plate and a lower friction plate, a friction plane of the upper friction plate and the lower friction plate having a characteristic of Coulomb friction; and horizontally placed springs which reduce a relative displacement and a residual displacement. The upper friction plate includes being any one selected from the group consisting of a polyacetal resin containing lubricating oil, a bronze or brass alloy with solid lubricant buried therein, a sintered alloy with solid lubricant dispersed therein, a porous structure of cast iron with lubricant oil contained therein and a steel backing sintered layer with solid lubricant and oil impregnated therein. Furthermore, the lower friction plate includes being any one surface-treated material selected from the group consisting of a hard chromium-plated plate and a hard nickel-plated plate. A pre-tension is introduced into the horizontally placed springs, the tension being applied to the springs within an area of tension.

18 Claims, 2 Drawing Sheets

4,917,211

SEISMIC ISOLATOR

FIELD OF THE INVENTION

1. Background of the Invention

The present invention relates to a seismic isolator which reduces a response acceleration arising from an earthquake and restrains a response displacement as well as a residual displacement under a desired value.

2. Description of the Prior Art

In order to protect a structure or equipment (hereinafter referred to as "Objective" when abbreviated) from damage due to an earthquake, a seismic isolator is usually made use of. The seismic isolator is installed between the Objective and a foundation or a floor slab. Through the seismic isolator, a response acceleration arising from the earthquake is reduced to be transmitted to the Objective. As a device built in sucha seismic isolator, a damping rubber, a spring, a damper or a friction plate has been customarily used. Furthermore, a combination of an elastic material and a damping rubber or viscous fluid, or a combination of a spring and a friction plate or a damper has been often used.

When springs are used, instead of friction plates for a seismic isolator, a pre-tension or a pre-compression is introduced into the springs so that an Objective is always fixed to the foundation or the floor slab. Therefore, when an earthquake occurs, the seismmic isolator does not operate until the inputted earthquake force, which is transferred to the Objective, exceeds the force of the pre-tension or pre-compression. The damping effect depends on the springs or dampers, not on the friction.

A seismic isolator, having only friction plates, starts its operation, when the friction plates begin to slide. When a seismic isolator is practically used, in addition to friction plates, the seismic isolator has a device of a damping rubber or a spring which works before the friction plates slide, and the seismic isolator operates even upon a small earthquake. Those prior art seismic isolators have problems, described herein-below, to be overcome.

A prior art seismic isolator, which has a slightly long natural period by means of arrangement of stiffness of an elastic rubber support so as to reduce a response acceleration, produces a large relative displacement between the Objective and the foundation or the floor slab even if a small earthquake occurs. Another prior art seismic isolator having a combination of an elastic rubber support and viscous fluid produces a relative displacement between the Objective and the foundation or the floor slab even on the small earthquake as well. The damping depends on the rubber or the viscous fluid. Therefore, not only the maintenance and inspection of the rubber or the viscous fluid but also the preventive measures for deterioration of those materials and for possible fire are required.

In a further prior art seismic isolator having friction plates, the friction plates do not slide, due to their own friction force, in response to a small earthquake, but it is possible that a residual displacement becomes large when a strong earthquake occurs. A seismic isolator used in practice has a device comprised of a damping rubber of a spring placed below or on its friction plates, and therefore, the total displacement would become fairly large and, at the same time, a large residual displacement would remain because the shearing force of the rubber is produced when the friction plates begin to slide. It is also difficult to restore the residual displacement to the initial position of the Objective. When prior art friction plates are used, the friction force depends on a relative velocity between the friction plates. Consequently, not only the operating acceleration but also the damping capability are unstable.

Computer processing units are usually guaranteed to maintain their function against a response acceleration of about 250 gal or less, but more than 250 is not always guaranteed. The response acceleration of the structure or the computer equipment varies every moment during the earthquake. Therefore, in case that a prior art friction material is used in a seismic isolator, the displacement from the initial position of the Objective, which is produced during the operation, or the residual displacement therefrom has a tendency to increase because the friction force is greatly affected by the feature of the friction material.

SUMMARY OF THE INVENTION

An object of the present invention is to provide a seismic isolator which not only reduces a response acceleration, transferred to a structure or equipment therein, arising from an earthquake but also restrains a response displacement and a residual displacement under a desired value, and which has a stable operating characteristic in the response acceleration, regardless of the acceleration arising from the earthquake being large or small.

To attain the object in accordance with the present invention, a seismic isolator is provided, comprising:

a friction device having an upper friction plate and a lower friction plate, a friction plane of the upper friction plate and the lower friction plate having a characteristic of Coulomb friction; and horizontally placed springs which reduce a relative displacement and a residual displacement.

The above and other objects and advantages of the present invention will become apparent from the detailed description to follow, taken in conjunction with the appended drawings.

DESCRIPTION OF THE PREFERRED EMBODIMENT

To overcome those problems in the prior art seismic isolators, a seismic isolator of the present invention comprises a friction device having an upper friction plate and a lower friction plate, a friction plane of the upper friction plate and the lower friction plate having Coulomb friction; and horizontally placed springs into which an initial tension being introduced.

As the upper friction plate, any one material selected from the group consisting of a polyacetal resin containing lubricating oil, a bronze or brass alloy with solid lubricant buried therein, a sintered alloy with solid lubricant dispersed therein, a porous structure of cast iron with lubricant oil contained therein and a steel backing and sintered layer with solid lubricant dispersed and oil impregnated therein is used, and as the lower friction plate any one surface-treated material selected from the group consisting of a hard chromium-plated plate or a hard nickel-plated plate is used.

Coulomb friction has a feature in that static coefficient of friction is equal to dynamic one and that the dynamic one is hardly affected by a relative velocity. Consequently, a seismic isolator having a friction device with a characteristic of the Coulomb friction and having a combination of springs and ball bearings provides the following advantages:

(a) Since the capability of damping energy is subject to the feature of a friction material to be used, a response acceleration can be easily made stable and reduced.

(b) The reduction of the acceleration in operation can be attained by means of substituting some pairs of the friction plates for such ball bearings as having a small coefficient of friction; and (c) By means of making use of the work of a spring system incorporated in the seismic isolator, the relative displacement can be restored and the residual displacement can also be within a predetermined range.

Figure 1A:
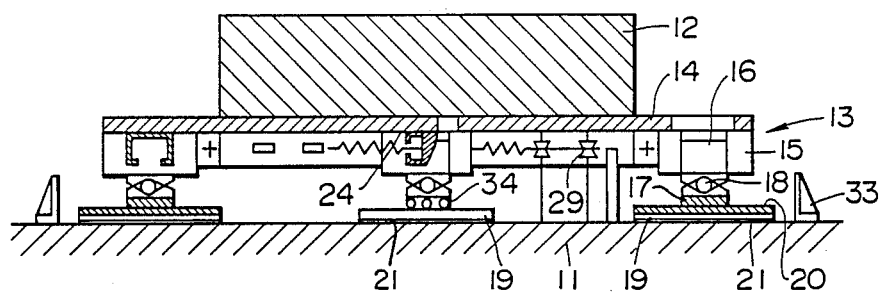
FIG. 1 schematically illustrates an embodiment of a seismic isolator of the present invention, (a) of FIG. 1 being an elevation view of the embodiment and (b) of FIG. 1 a plan view thereof.
Figure 1B:
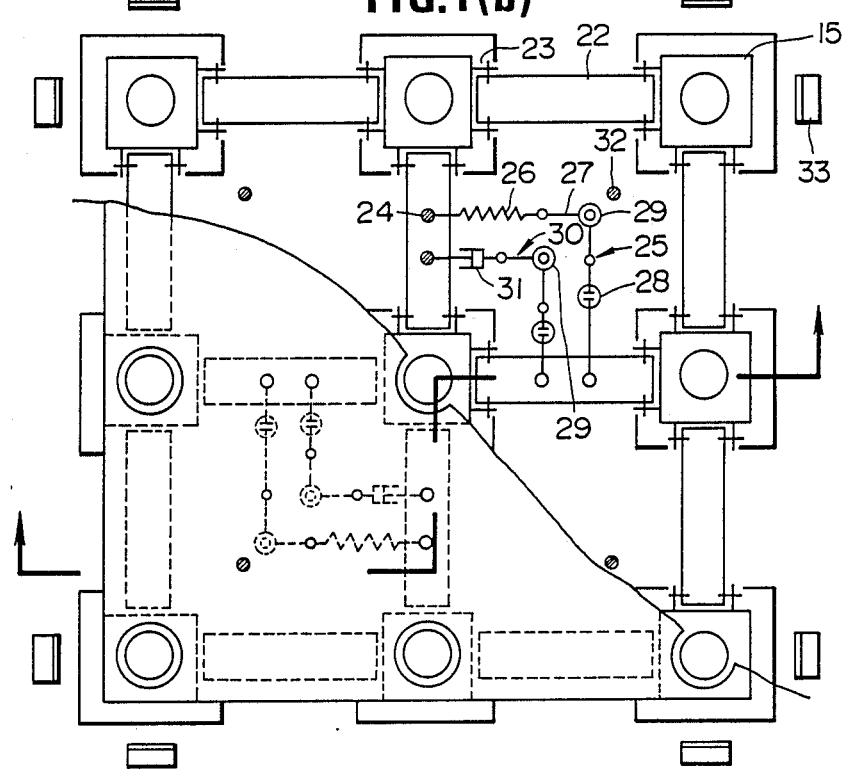

Now, with specific reference to the appended drawings, a preferred embodiment of the present invention will be described. FIG. 1 schematically shows an embodiment of a seismic isolator of the present invention, (a) of FIG. 1 being an elevation view of the embodiment, and (b) of FIG. 1 a plan view thereof.

Referential numeral 11 denotes a foundation or a floor slab, 12 an Objective (a structure or equipment), 13 a seismic isolator, 14 a cover plate, 15 slide blocks, 16 a height adjuster with a ball joint 18, 17 an upper friction plate, 19 a slide plate, 20 a lower friction plate, 21 a damping rubber sheet for damping vibrations, 22 a beam element, 23 a bolt connection, 24 a pin joint, 25 a spring system, 26 springs horizontally placed, 27 a wire element, 28 a length adjuster, 29 pulleys, 30 a damper system, 31 a damper, 32 a stopper, 33 a displacement revision jig and 34 ball bearings.

As shown in FIG. 1, seismic isolator 13 is installed between foundation or floor slab 11 and Objective 12. A friction plane is formed by an upper friction plate 17 and lower friction plate 20, the upper friction plate being arranged below ball joint 18 and the lower friction plate being placed on slide plate 19 which is fixed, together with damping rubber sheet 21, on the foundation or the floor slab. The upper friction plate is made of a polyacetal resin containing lubricating oil and the lower friction plate is made of a hard chromium-plated stainless steel sheet.

Furthermore, height adjuster 16 with ball joint 18 is guided and inserted vertically by and between side blocks 15 so as to adjust a height level of friction plate 17. The height adjuster 16 follows the slope deflection of the slide plate 19 at the time of setting or replacing the friction plates. On blocks 15, cover plate 14 is placed and Object 13 is laid on the blocks. The blocks are also connected to beam element 22 by means of bolt connection 23.

Now, the work of a seismic isolator, which has the constitution as mentioned above, will be described hereinbelow.

When an earthquake acceleration is inputted to seismic isolator 13, the friction plane of upper friction plate 17 and lower friction plate 20 causes Coulomb friction, because a pair of those friction plates have a characteristic of the Coulomb friction. When the force inpputed to Objective 13 by the earthquake is smaller than the Coulomb friction force, no relative displacement is produced between friction plates 17 and 20. If the force inputted to the Objective becomes equal to or greater than the Coulomb friction force, a relative displacement is produced between the friction plates, and a spring force corresponding to the relative displacement is developed to work on spring system 25 as a restoring force. Damping rubber sheet 21, which is inserted fixedly between slide plate 19 and foundation or floor slab 11, is used in damping high frequency components of vibrations arising out of the earthquake.

The stiffness of bolt connection 23 connecting beam element 22 to slide blocks 15 is controlled so as for the Objective to follow a deflection of foundation or floor slab 11. Stopper 32 takes a roll of stopping an excessive displacement. For the stopper, material, such as steel material, a vibration damping rubber and a visco-elastic material, having a large energy absorption capability is preferably used.

Figure 2:
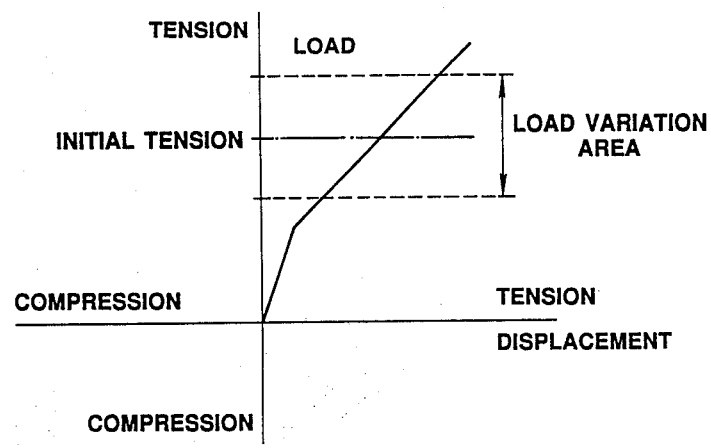
FIG. 2 is a graphic representation of an area where a pre-tension force is introduced into springs of the present invention.

Spring system 25 comprising springs 26, wire element 27 and a length adjuster 28 is looped through pulley 29 to be connected to pin joint 24 which is fixed to beam element 22. Length adjuster 28 controls a length of wire element 27 to introduce pre-tension into springs 26. Since pulley 29 is fixed to foundation or floor slab 11, spring system 25 lies between beam element 22 and foundation or floor slab 11. An initial pre-tension force is introduced, by means of length adjuster 28, into spring system 25. As shown in FIG. 2, springs 26 are always used within an area where a tension varies so as to set the natural period of seismic isolator 13 as an optimum value. When damper 31 is provided with spring system 25 so as to increase the damping capability of the seismic isolator, a part of springs 26 is replaced by damper 31 as the case may be. As shown in FIG. 1, at least one pair of the spring system or the damping system is installed in a diagonal direction, and thus, a seismic isolator which is workable in two horizontal directions can be easily obtained, one of the two directions crossing at right angles to the other. Furthermore, it is preferable to set displacement revision jig 33 around foundation or slab floor 11 so as to amend a position of a residual displacement.

In addition, in order to further reduce a response acceleration in operation, it is also preferable that another device for rolling friction is arranged so as to operate in combination with the Coulomb friction function of upper friction plate 17 and lower friction plate 20. This device has simply the ball bearings, instead of the two friction plates 17 and 20 forming the friction device.

Parts for a seismic isolator are easy to be standardized into an individual unit, the seismic isolator is light in weight and low in level height and therefore, it is easy and simple for construction work.

Moreover, it is of low construction cost and free from maintenance.

It should be noted that a plurality of seismic isolators such as the embodiment shown in FIG. 1 can be combined, as one unit, into a large scale seismic isolator.

In the seismic isolator of the present invention, an operating response acceleration arising from an earthquake excitation, a maximum displacement and a residual displacement can be put within a desired level by means of selecting a coefficient of friction or spring stiffness of material to be used because the Coulomb friction can be applied to the selected material.

Furthermore, the response results become stable and reproducible. Even if a residual displacement exists, the displacement can be revised easily to the original position because the coefficient of friction is fairly small.

While the preferred embodiment of the present invention has been described, it is to be understood that modifications will be apparent to those skilled in the art without departing from the spirit of the invention. The scope of the invention, therefore, is to be determined solely from the following claims.

What is claimed is:

1. Seismic isolator apparatus placed between a foundation including a floor slab, and an objective to be protected from an earthquake to reduce a responsive acceleration arising therefrom, comprising:
   a combination of an upper friction plate and a lower friction plate which are in frictional contact along a friction plane;
   the upper friction plate being fixed to the objective;
   the upper friction plate being made from a material selected from the group consisting of polyacetal resin containing lubricating oil, a bronze alloy with solid lubricant dispersed therein, a brass alloy with solid lubricant dispersed therein, a sintered alloy with solid lubricant dispersed therein, a porous structure of cast iron with lubricant oil contained therein and a steel backing sintered layer with solid lubricant and oil impregnated therein;
   the lower friction plate being fixed to the foundation;
   the lower friction plate being made from a material selected from the group consisting of a hard chromium-plated plate and a hard nickel-plated plate; and
   a horizontally positioned spring system fixed to the objective and to the foundation.

2. The apparatus of claim 1, wherein said upper friction plate is made from polyacetal resin containing lubricant oil and said lower friction plate is made from a hard chromium-plated plate.

3. The apparatus of claim 1, wherein said upper friction plate is made from polyacetal resin containing lubricant oil and said lower friction plate is made from a hard nickel-plated plate.

4. The apparatus of claim 1, wherein said upper friction plate is made from a bronze alloy with solid lubricant dispersed therein and said lower friction plate is made from a hard chromium-plated plate.

5. The apparatus of claim 1, wherein said upper friction plate is made from a bronze alloy with solid lubricant dispersed therein and said lower friction plate is made from a hard nickel-plated plate.

6. The apparatus of claim 1, wherein said upper friction plate is made from a brass alloy with solid lubricant dispersed therein and said lower friction plate is made from a hard chromium-plated plate.

7. The apparatus of claim 1, wherein said upper friction plate is made from a brass alloy with solid lubricant dispersed therein and said lower friction plate is made from a hard nickel-plated plate.

8. The apparatus of claim 1, wherein said upper friction plate is made from a sintered alloy with solid lubricant therein and said lower friction plate is made from a hard chromium-plated plate.

9. The apparatus of claim 1, wherein said upper friction plate is made from a sintered alloy with solid lubricant therein and said lower friction plate is made from a hard nickel-plated plate.

10. The apparatus of claim 1, wherein said upper friction plate is made from a steel backing sintered layer with solid lubricant and oil impregnated therein and said lower friction plate is made from a hard chromium-plated plate.

11. The apparatus of claim 1, wherein said upper friction plate is made from a steel backing sintered layer with solid lubricant and oil impregnated therein and said lower friction plate is made from a hard nickel-plated plate.

12. The apparatus of claim 1, further comprising a height adjuster for supporting the objective and having a ball joint on said upper friction plate, the height adjuster being inserted between slide blocks to be vertically guided by the slide blocks.

13. The apparatus of claim 1, wherein the lower friction plate has a slide plate together with a damping rubber sheet.

14. The apparatus of claim 1, further comprising a height adjuster for supporting the objective, a slide plate fixed to the foundation with a damping rubber sheet, and ball bearings fixed to the height adjuster in rolling contact with the slide plate, the height adjuster having a ball joint and being inserted between slide blocks to be vertically guided by the slide blocks.

15. The apparatus of claim 1, wherein said spring system comprises a spring, a wire element, a length adjuster and a pulley fixed to the foundation, the spring being hooked by means of the wire element over the pulley at a right angle and being fixed to beam elements of the objective at both ends, the length adjuster introducing a pre-tension into the spring system so that the spring system operates within a predetermined area of tension where the tension varies in response to a work load.

16. The apparatus of claim 1, further comprising a damper, the damper having a wire element, a pulley fixed to the foundation, and a length adjuster which adjusts the length of the wire element, the wire element being hooked horizontally over the pulley at a right angle and fixed to beam elements of the objective at both ends.

17. Seismic isolator apparatus placed between a foundation including a floor slab, and an objective to be protected from an earthquake to reduce a responsive acceleration arising therefrom, comprising:
   a combination of an upper friction plate and a lower friction plate which are in frictional contact along a friction plane;
   the upper friction plate being fixed to the objective;
   the upper friction plate being made from polyacetal resin containing lubricating oil;
   the lower friction plate being fixed to the foundation;
   the lower friction plate being made from a hard chromium-plated plate;
   the lower friction plate having a slide plate together with a damping rubber sheet, which is placed on the foundation;
   a height adjuster for supporting the objective and having a ball joint on said upper friction plate, the height adjuster being inserted between slide blocks to be vertically guided by the slide blocks and the slide blocks being fixed to a cover plate on which the objective is positioned;
   a horizontally positioned spring system fixed to the objective and to the foundation, said spring system comprising a spring, a wire element, a length adjuster and a pulley fixed to the foundation, the spring being hooked by means of the wire element over the pulley at a right angle and being fixed to beam elements of the objective at both ends, the length adjuster introducing a pre-tension into the spring system so that the spring system operates within a predetermined area of tension where the tension varies in response to a work load; and a damper having a wire element, a pulley fixed to the foundation, and a length adjuster which adjusts the length of the wire element, the wire element being hooked horizontally over the pulley at a right angle and fixed to beam elements of the objective at both ends.

18. The apparatus of claim 17, further comprising ball bearings fixed to at least one said height adjuster and in rolling contact with at least one respective slide plate, the height adjuster having a ball joint and being inserted between slide blocks to be vertically guided by the slide blocks, and the slide blocks being fixed to a cover plate on which the objective is positioned, and the slide plate together with the damping rubber sheet being placed on the foundation.

* * * * *